United States Patent
Marty

(10) Patent No.: US 6,741,654 B1
(45) Date of Patent: May 25, 2004

(54) MPEG DECODING CIRCUIT DISPLAYING IMAGES AND INCRUSTED IMAGES

(75) Inventor: Pierre Marty, Seyssins (FR)

(73) Assignee: STMicroelectronics, S.A., Montrouge (FR)

( * ) Notice: Subject to any disclaimer, the term of this patent is extended or adjusted under 35 U.S.C. 154(b) by 412 days.

(21) Appl. No.: 09/705,339

(22) Filed: Nov. 2, 2000

(30) Foreign Application Priority Data

Nov. 3, 1999 (FR) .............................. 99 14009

(51) Int. Cl.$^7$ .................................. H04N 7/18
(52) U.S. Cl. .............................. 375/240.25; 375/240.21
(58) Field of Search ............................ 375/240.1–240.29

(56) References Cited

U.S. PATENT DOCUMENTS

| | | | | |
|---|---|---|---|---|
| 5,635,985 A | | 6/1997 | Boyce et al. ................ | 348/402 |
| 5,969,768 A | | 10/1999 | Boyce et al. ................ | 348/565 |
| 6,028,635 A | * | 2/2000 | Owen et al. ........... | 375/240.18 |
| 6,141,059 A | * | 10/2000 | Boyce et al. ................ | 348/565 |
| 6,421,094 B1 | * | 7/2002 | Han ........................... | 348/569 |
| 6,573,905 B1 | * | 6/2003 | MacInnis et al. ........... | 345/629 |

FOREIGN PATENT DOCUMENTS

| | | |
|---|---|---|
| EP | 0778709 | 6/1997 |
| EP | 0782345 | 7/1997 |
| EP | 0794673 | 9/1997 |
| EP | 0 847 203 A2 | 6/1998 |
| WO | WO 98/26606 | 6/1998 |

* cited by examiner

*Primary Examiner*—Andy Rao
(74) *Attorney, Agent, or Firm*—Lisa K. Jorgenson; Timothy L. Boller; Seed IP Law Group PLLC

(57) ABSTRACT

A circuit including a memory connected to be accessible from a bidirectional bus, an MPEG decoder connected to the bus to be able to read coded and decoded data in the memory, and having a decoded data output connected to the bus according to a first path to be able to read from the memory data of a first image, and a first image display circuit, an input of which is connected to the bus to read from the memory the data written by the decoder, which also includes a decimator circuit, connected between the output of the decoder and the bus according to a second path to be able to write into the memory data of a second image, and a second image display circuit connected to the bus to read from the memory the data written by the decimator circuit.

15 Claims, 2 Drawing Sheets

MPEG DECODING CIRCUIT DISPLAYING IMAGES AND INCRUSTED IMAGES

TECHNICAL FIELD

The present invention relates to circuits for decompressing image sequences, coded according to an MPEG standard and intended for being provided to a display circuit, and more specifically to an integrated circuit enabling displaying on a screen images incrusted in main images.

BACKGROUND OF THE INVENTION

The MPEG coding standard enables storing the images of a digital image sequence in a reduced memory space. The MPEG coding provides digitizing the images of a sequence according to three categories. The beginning and end images of the sequences are coded independently and are called the "intra" images. A number of intermediary images, called "predicted" images, are coded by taking account of their difference with the preceding intra or predicted image. The other images, called "bidirectional" images, are coded by taking account of the intra or predicted images surrounding them. At the decoder level, coded image sequences are stored in a first memory and two successive decoded intra/predicted images are stored in a buffer. The first memory and the buffer usually are two areas of a same memory in which the MPEG decoder can read and write via a bus.

FIG. 1 very schematically shows an integrated circuit 2 that includes an MPEG decoder 4 connected to a bidirectional bus 8 by a coded data input CDI, a decoded data input DDI, and a decoded data output DDO. A memory 6 is also connected to be able to read or write on bus 8, and a display circuit 10 is connected to read on bus 8.

The function of decoder 4 is to decode coded images stored in memory 6. The decoder must, to decode certain images, use two previously-decoded images (intra/predicted). These two images are stored in memory 6 after their decoding by decoder 4. On the other hand, an image decoded by decoder 4 is not read immediately by display circuit 10, but is temporarily stored in memory 6. Thus, memory 6 must be able to contain, in addition to the coded images, three decoded images. Display circuit 10 displays each decoded image by reading it row by row from memory 6. The data read row by row are especially filtered and synchronized to be directly displayable, for example, by a television screen.

Many analog television sets provide, in addition to the display of a main image, the display of a sub-image, or incrusted image, on a fraction of the screen. It is also desired, in digital television, to make a circuit for decoding image sequences coded according to standard MPEG, which enables simultaneously displaying an incrusted image and a main image. An obvious solution would consist of duplicating circuit 2 to respectively decode and display the main images and the images to be incrusted. This solution would result in considerably increasing the cost of a television set, all the more as the circuit associated with the image to be incrusted will have to be even faster than the conventional circuit since the data associated with an image to be incrusted, of lower height than the normal height of an image, are of the same number as the data associated with a normal image but must be read in a fraction of the normal image scanning duration.

SUMMARY OF THE INVENTION

An embodiment of the present invention provides an electronic circuit that enables decoding and displaying a main image and an incrusted image while sharing the use of a single MPEG decoder and a single memory.

The circuit has limited memory size and memory reading speed requirements associated with the sharing of the memory.

The electronic circuit includes a memory connected to be accessible in the read and write mode from a bidirectional bus, an MPEG decoder having a coded image data input and a decoded image data input, the decoded image data corresponding to pixel sequences and the decoder inputs being connected to the bus to be able to read from the memory, and having a decoded image data output connected to the bus according to a first path to be able to write into the memory data of a first image, and a first image display circuit, an input of which is connected to said bus to be able to read from the memory the data written by the decoder, which further includes:

a digital filter providing one pixel among any sequence of a predetermined number of pixels, connected between the decoder output and said bus according to a second path to be able to write into the memory data of a second image, and a second image display circuit, an input of which is connected to the bus to be able to read from the memory the data written by the filter.

According to an embodiment of the present invention, the electronic circuit also includes a compression circuit connected in the first path, a first decompression circuit connected between the bus and the decoded data input of the decoder, and a second decompression circuit, followed by a block-to-row conversion circuit, connected between the bus and the first display circuit.

The objects, features and advantages of the present invention will be discussed in detail in the following non-limiting description of specific embodiments in connection with the accompanying drawings.

DETAILED DESCRIPTION OF THE INVENTION

Figure 1:
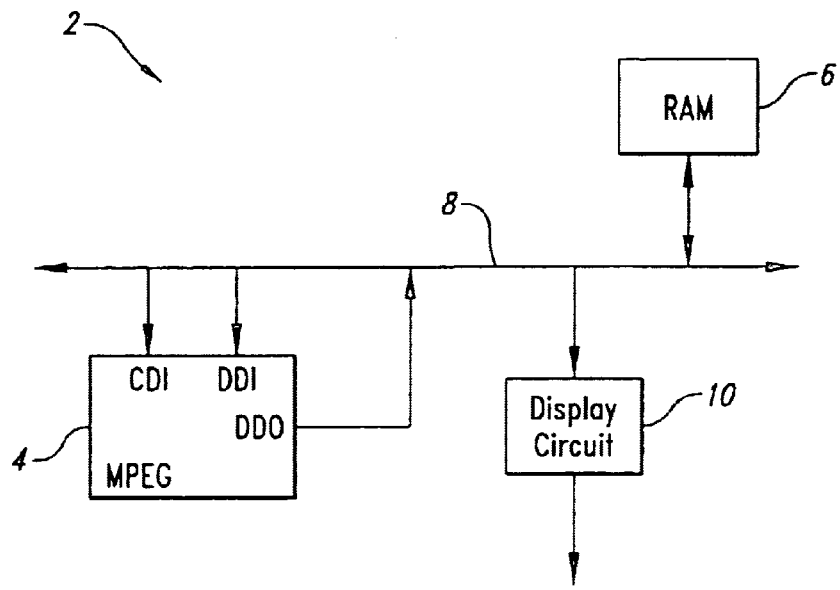
FIG. 1, previously described, schematically shows an MPEG decoding circuit for the display of main images only.
Figure 2:
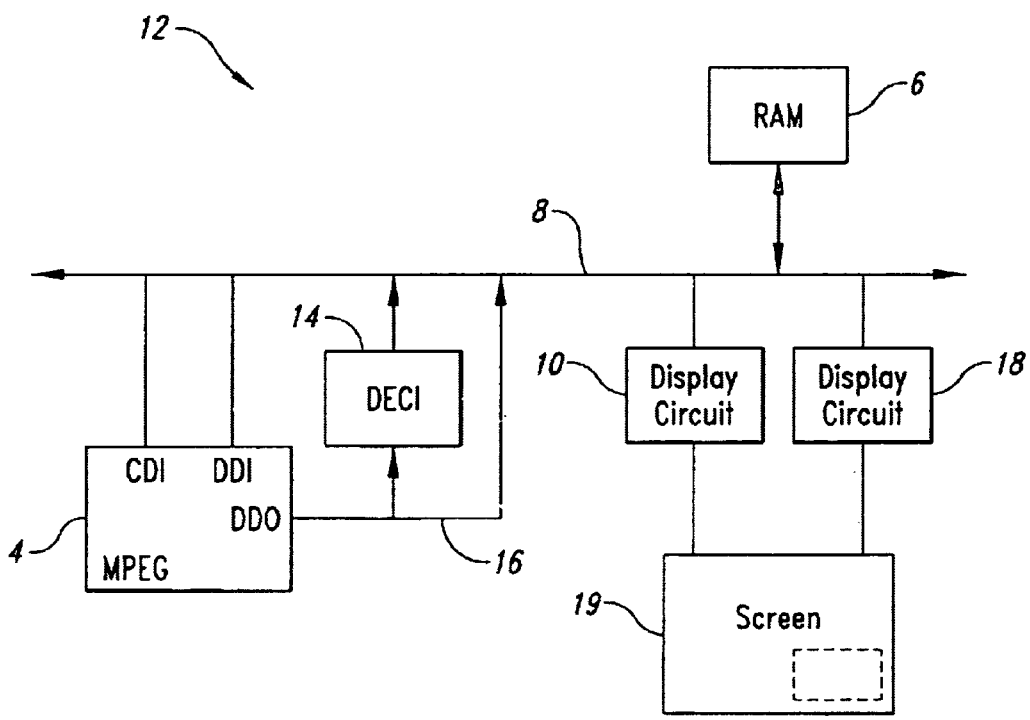
FIG. 2 schematically shows a first embodiment of an MPEG decoding circuit for the display of main images and incrusted images according to the present invention.
Figure 3:
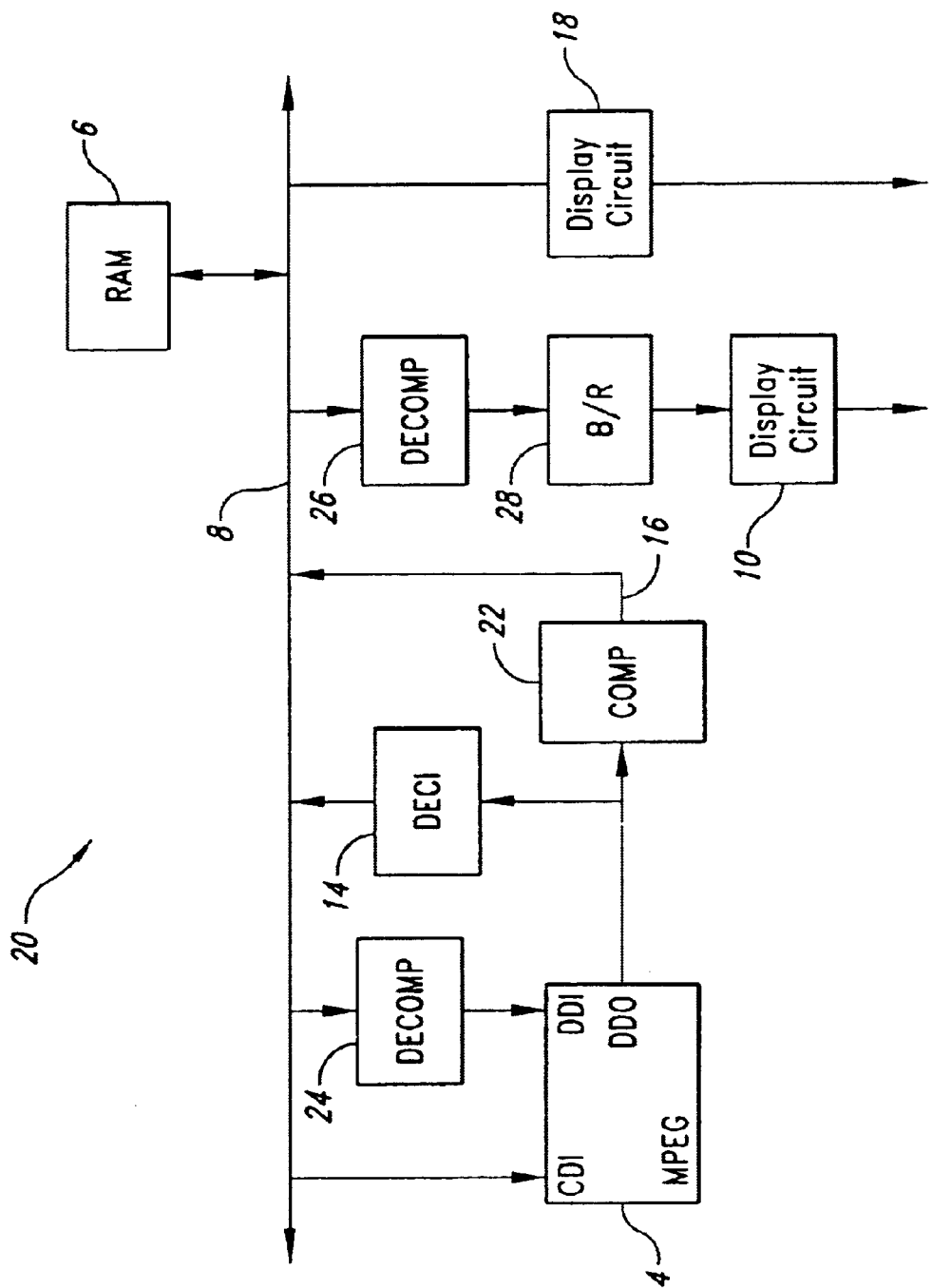
FIG. 3 schematically shows a second embodiment of an MPEG decoding circuit for the display of main images and incrusted images according to the present invention.

Same references represent same elements in FIGS. 1 to 3.

FIG. 2 schematically shows an integrated circuit 12 similar to circuit 2 of FIG. 1, using a single decoder, which enables decoding and displaying a main image and an incrusted image based on image sequences coded according to standard MPEG. Circuit 12 includes, in addition to the elements of circuit 2, a "decimator" circuit or digital filter 14 connected between bus 8 and output DDO of decoder 4, in parallel with a simple bus 16. A second display circuit 18 is also connected to bus 8. Display circuits 10 and 18 are conventionally connected to a same display device such as a screen 19.

In circuit 12, the main images are decoded, stored, and displayed in the way previously described, by using bus 16. However, the images to be incrusted must undergo a size reduction, or "decimation" between their decoding and their display. Indeed, the images to be incrusted are images that originally have the same size as the main images, but that must be displayed by display circuit 18 with a reduced size. Decimator circuit 14 thus has the function of only generating one for n pixels, n being the desired reduction ratio of the decoded image to be incrusted. A decoded and "decimated" image to be incrusted, written into memory 6 by decimator circuit 14, can be read and directly displayed by display circuit 18, be it of "intra", "predicted", or "bidirectional" type. However, a decoded intra or predicted image can no longer be used by decoder 4 once it has been decimated while, as seen previously, these images are necessary for the bidirectional image decoding. Thus, when a predicted or intra image to be incrusted is decoded, it is stored in memory 6 both in non-decimated form, directly through bus 16, to be subsequently used by decoder 4, and in decimated form for a subsequent display. When a bidirectional image to be incrusted is decoded, it is stored in memory 6 in decimated form only, for a subsequent display. It should be noted that buffers (not shown) are located between bus 8 and bus 16, as well as at the output of decimator circuit 14, for temporarily storing the decimated and non-decimated form of each decoded image to be incrusted until they are written into memory 6.

Circuit 12 must operate sufficiently fast to decode and display a main image and an image to be incrusted in one display period. For this purpose:

within the duration of a display period, decoder 4 must be able to decode a main image and an image to be incrusted, that is, to read from memory 6 two coded images and four decoded images and write therein two decoded images and one decimated decoded image;

within the duration of a display period, display circuit 10 must be able to read one decoded image from memory 6;

at the same speed, display circuit 18 must be able to read from memory 6 one decimated decoded image. Indeed, the display of the image to be incrusted is performed on a portion only of the screen, and lasts for a shorter time than the display period of an image over the entire screen, but there are less data to be read since the image data have been previously decimated. In other words, the ratio between the number of data to be read and the duration available to read said data is reduced. This is a first advantage of the present invention with respect to the case where non-decimated images are stored: it is not necessary to very rapidly read an entire non-decimated image to only display a portion thereof. Accordingly, the circuit has a speed only twice greater than that of a normal circuit. In other words, the circuit has an instantaneous memory passband that is only twice greater than that of a normal circuit.

According to a second aspect of the present invention, it is desired to further reduce this speed by adding compression/decompression means to the circuit of FIG. 2.

FIG. 3 schematically shows an integrated circuit 20 enabling this speed reduction and including, in addition to the elements of circuit 12, a compression circuit 22, decompression circuits 24 and 26 and a block-to-row conversion circuit 28. Compression circuit 22 is connected between output DDO of decoder 4 and bus 16. Decompression circuits 24 and 26 are connected between bus 8 and respectively, input DDI of decoder 4 and display circuit 10. The compression circuit uses a known algorithm to reduce the size occupied in the memory by the non-decimated decoded images. A compressed image must be decompressed by one of decompression circuits 24 or 26 before it can be used respectively by decoder 4 and by display circuit 10. It should be noted that the decompressed data are conventionally generated in the form of blocks while display circuit 10 uses data in the form of rows. Thus, block-to-row conversion circuit 28 is placed at the output of decompression circuit 26.

Calling k the compression ratio of the images by compressor 22, a compressed decoded image, stored in memory 6, can be written and read at a speed k times smaller than that which is required to read and write non-compressed images. On the other hand, since compressed decoded images have a k times reduced size, the size of memory 6 can be reduced. Circuit 20 thus enables using a memory 6 substantially k times slower, and less expensive than that of circuit 12.

For example, an image to be incrusted that conventionally requires 3×24=72 megabits in the memory can, according to the present invention, be stored in 2×2 4/4 megabits for the 2 compressed images with a value k=4 plus 3×(24/16) megabits for the three images decimated with a factor 4 for the height as for the width, that is, a total of 16.5 megabits.

It should be noted that the use of the compression/decompression circuits according to the present invention is particularly advantageous as compared to their use with, for example, a circuit such as that in FIG. 1 duplicated to display the main and incrusted images. Such a use would enable dividing by k the operating speed of the memories of the duplicated circuit. However, it would require using, in the display line of the images to be incrusted circuits sufficiently fast to decompress and convert from blocks to rows the images to be incrusted in a fraction of the normal frame scanning duration. Such circuits, which are particularly complex to implement, are not necessary according to the present invention.

Of course, the present invention is likely to have various alterations, modifications, and improvements which will readily occur to those skilled in the art. As an example, a circuit in which the decoded images intended to be displayed as main images can be stored in non-compressed form may be envisaged. This would enable simplifying their display line by suppressing decompression circuit 26 and block-to-row conversion circuit 28, at the cost of an increase of the size and speed of memory 6. It may also be envisaged to compress the decoded images to be incrusted stored in the memory, which will enable shortening their write and read time, and further decreasing the memory operating speed at the cost of an increase of the circuit complexity. Further, memory 6 can indifferently be a memory internal to the circuit or an external memory, for example connected to bus 8 by a parallel access.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A electronic circuit, comprising:

a memory connected to be accessible in read and write modes from a bidirectional bus;

an MPEG decoder having a coded image data input and a decoded image data input, the decoded image data corresponding to pixel sequences and the decoder inputs being connected to the bus to be able to read from the memory, and the MPEG decoder having a decoded image data output connected to the bus according to a first path to be able to write into the memory data of a first image;

a first image display circuit, an input of which is connected to said bus to be able to read from the memory the data written by the decoder;

a digital filter providing one pixel among any sequence of a predetermined number of pixels, connected between the decoder image data output and said bus according to a second path to be able to write into the memory data of a second image, and a second image display circuit, an input of which is connected to the bus to be able to read from the memory the data written by the filter.

2. The electronic circuit of claim 1, including:

a compression circuit connected in the first path, a first decompression circuit connected between the bus and the decoded data input of the decoder; and a second decompression circuit, followed by a block-to-row conversion circuit, connected between the bus and the first display circuit.

3. A electronic circuit, comprising:

a bi-directional bus over which image data is transmitted;

an MPEG decoder coupled to the bus by a first input path and first and second output paths, the MPEG decoder being structured to produce and transmit on the first and second output paths respective decoded first image data and decoded second image data from coded image data received through the first input path;

a digital filter connected between the data output and the bus along the second output path, the digital filter being structured to decimate the decoded second image data by removing a first subset of image data pixels comprising the decoded second image data and thereby leaving a second subset of the image data pixels as decimated second image data; and a display system coupled to the bus and structured to simultaneously display a first image based on the first image data and a second image based on the decimated second image data.

4. The electronic circuit of claim 3, further comprising:

a memory coupled to the bus, the memory being structured to store the coded image data, the decoded first image data, and the decimated second image data; wherein the MPEG decoder is structured to read the coded image data from the memory and write the decoded first image data to the memory, the digital filter is structured to write the decimated second image data to the memory, and the display system is structured to read the decoded first image data and the decimated second image data from the memory.

5. The electronic circuit of claim 3 wherein the display system includes:

a display unit that displays images;

a first image display circuit having an input connected to the bus and an output coupled to the display unit, the first image display circuit being structured to obtain the decoded first image data from the bus and cause the display unit to display a first image based on the first image data; and a second image display circuit having an input connected to the bus and an output coupled to the display unit, the second image display circuit being structured to obtain the decimated second image data from the bus and cause the display unit to display a second image, based on the decimated second image data, while the first image is also displayed.

6. The electronic circuit of claim 1, further comprising:

a compressor coupled in the first output path between the MPEG decoder and the bus, the compressor being structured to compress the decoded first image data;

a first decompressor coupled in a second input path between the bus and the MPEG decoder, the first decompressor being structured to decompress portions of the decoded first image data and the MPEG decoder being structured to use the decompressed portions of the decoded first image data to decode the coded image data; and a second decompressor positioned between the bus and the display system, the second decompressor being structured to decompress the compressed decoded first image data.

7. The electronic circuit of claim 6, further comprising:

a block-to-row conversion circuit coupled between the second decompressor and the display system and structured to convert blocks of image data decompressed by the second decompressor into rows of image data for display by the display system.

8. A method of processing image data, comprising:

receiving coded first image data and coded second image data;

decoding with a single MPEG decoder the coded image data of the first and second images, thereby producing decoded first image data and decoded second image data each comprising plural image pixels;

decimating the decoded second image data by discarding a first subset of the image pixels of the decoded second image data and transmitting a second subset of the image pixels of the decoded second image data on a bus;

converting the decoded first image data into a first image and the second subset into a second image; and displaying simultaneously the first and second images on a display device.

9. The method of claim 8, further comprising:

storing the coded first and second image data, the decoded first image data, and the second subset in a memory coupled to the MPEG decoder;

reading the coded first and second image data from the memory for use by the MPEG decoder in decoding the coded first and second image data;

writing the decoded first image data and the second subset to the memory; and reading the decoded first image data and the second subset from the memory for use in converting the decoded first image data into a first image and the second subset into a second image.

10. The method of claim 8 wherein:

the converting step is performed by first and second image display circuits, the first image display circuit converting the decoded first image data into the first image and the second image display circuit converting the second subset into the second image; and the displaying step is performed by a display unit coupled to the first and second image display circuits.

11. The method of claim 8, further comprising:

compressing the decoded first image data;

decompressing portions of the compressed decoded first image data, wherein the decoding step includes using the decompressed portions to decode the coded image data; and decompressing the compressed decoded first image data to obtain decompressed first image data, wherein the converting step includes converting the decompressed first image data to the first image.

12. The method of claim 11, further comprising:

converting blocks of the decompressed first image data into rows of the first image.

13. The electronic circuit of claim 1 wherein the first image display circuit is configured to drive display of the first image and the second image display circuit is configured to drive display of the second image.

14. An electronic circuit comprising:

means for receiving coded first image data and coded second image data;

means for decoding with a single MPEG decoder the coded image data of the first and second images, thereby producing decoded first image data and decoded second image data each comprising plural image pixels;

means for decimating the decoded second image data by discarding a first subset of the image pixels of the decoded second image data and producing a second subset of the image pixels of the decoded second image;

means for storing the decoded first image data and the second subset of the image pixels of the decoded second image data; and means for converting the stored first image data into a first image and the stored second subset of the image pixels of the decoded second image data into a second image.

15. An electronic circuit comprising:

means for receiving coded first image data and decoded second image data, the second image data comprising plural image pixels;

means for decoding the coded image data of the first image, thereby producing decoded first image data comprising plural image pixels;

means for decimating the decoded second image data by discarding a first subset of the image pixels of the decoded second image data and producing a second subset of the image pixels of the decoded second image data;

means for storing the decoded first image data and the second subset of the image pixels of the decoded second image data; and means for converting the stored first image data into a first image and the stored second subset of the image pixels of the decoded second image data into a second image.

* * * * *